Patented Apr. 25, 1933

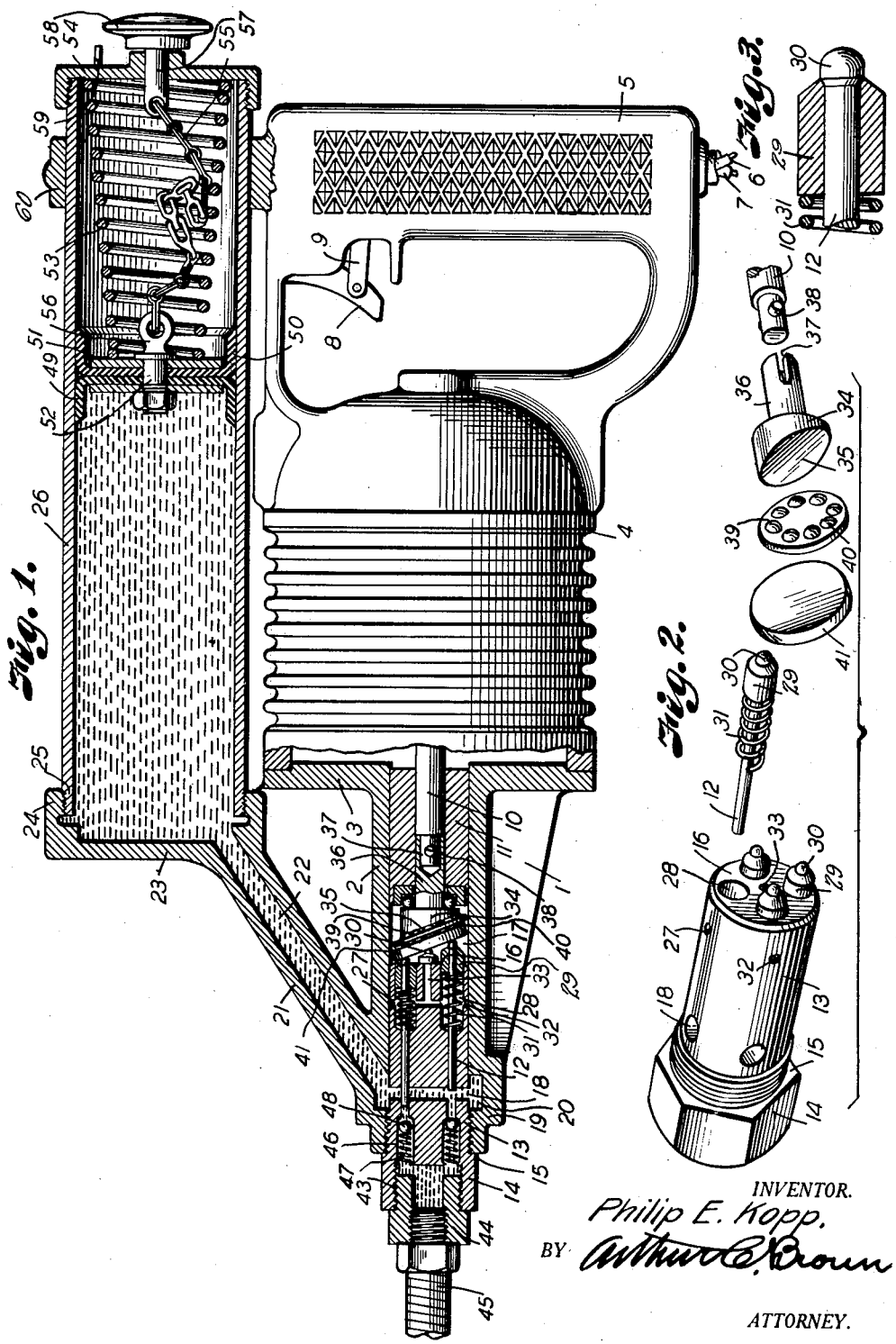

1,905,913

UNITED STATES PATENT OFFICE

PHILIP E. KOPP, OF KANSAS CITY, MISSOURI

GREASE GUN

Application filed April 23, 1930. Serial No. 446,524.

My invention relates to pressure lubricators or grease guns of the type adapted to force grease into ducts of bearings of a machine, and ordinarily provided with grease tanks or the like whereby a supply of grease may be delivered to the forcing elements for discharge under pressure.

Devices of this character are provided with nozzles adapted to sealingly engage valves in inlet channels of parts to be greased, the grease being moved with sufficient pressure from the supply tank to maintain delivery of the supply, and pressure being built up by levers or the like for injecting the grease through the inlet valves to parts to be lubricated.

In portable devices of this character, the pressure for discharging grease from a pump or gun is built up by manually operated levers though motor actuated pressure mediums have been provided for stationary pressure lubricators whereby relatively high pressures may be applied to the grease for assuring movement of lubricant into the areas communicating with the inlet valve.

When the grease in a bearing becomes hard, for example due to drying, the piston cannot be operated manually without excessive effort, if at all, and excessive strains are put on apparatus provided with motor-operated pumps.

Pressure lubricators of the character described are sometimes provided with supply tanks or pumps having spring-pressed pistons for applying and maintaining pressure to move grease from the tank toward the discharging elements of the apparatus, the pistons being withdrawn by manually operated rods to draw grease into the tanks. The rods must be held in extended position against the pressure of the expelling spring until the tanks are mounted on the support and then still project and tend to interfere with convenient operation of the device until the piston has moved substantially all of the contained grease from the tank.

In view of the conditions above described, my invention has for its principal objects to provide a portable pressure lubricator or grease gun having sufficient force to assure injection of grease to parts to be lubricated, to mount a pressure supplying motor on a portable grease gun, to effect building up of a substantial amount of pressure by small increments whereby a relatively small motor may exert a pumping effect capable of satisfactorily discharging grease against abnormal resistance, to employ a plurality of plungers successively operated at short intervals by a relatively small motor for discharging the grease from a grease gun, and to apply a rapid succession of relatively small impulses to small areas of a body of material, whereby a relatively small force may build up relatively high pressure values.

Further objects of the invention are to afford means for latching a piston retracting member in retracted position in a grease supply tank, and to provide for housing the retracted member in the tank between incidents of use thereof, whereby the necessity for manually retaining a piston operated member against the pressure of a grease delivering spring may be obviated and the interference of a projecting piston operating member may be avoided.

In accomplishing these and other objects of my invention, I have provided improved details of structure, the preferred forms of which are illustrated in the accompanying drawing, wherein:

Fig. 1 is a longitudinal vertical section of a pressure lubricator or grease gun constructed in accordance with my invention, showing a motor and pistol grip provided with a switch-operating trigger in side elevation.

Fig. 2 is a slightly enlarged perspective view of disassembled members of a grease discharging device, a clutch equipped end of a motor shaft being shown fragmentarily and one of the four plungers being shown removed from the plunger-supporting body.

Fig. 3 is a fragmentary sectional view of the head end of one of the plungers including a portion of a plunger retracting spring.

Referring in detail to the drawing:

1 designates a body or support including an elongated tubular portion 2 which will be referred to as the barrel having a longitudinal bore or channel, and a rear end radial flange 3 grooved to receive a handle member including a motor housing 4, a grip 5 forming a case for electrical conductors 6 and 7. A trigger 8 is pivotally mounted on the handle for operating a link 9 adapted to control a switch (not shown) for breaking and closing a circuit through the conductors for energizing a motor, not shown in detail, represented by the housing 4.

The armature or shaft 10 of the motor extending in the bore of the barrel 2 and rotatably supported manually therewith by a filler block 11, is adapted to operate elements presently described, including plungers 12 for discharging grease from the apparatus.

Mounted in the internally screwthreaded outer end portion of the barrel is a plunger support including a cylindrical body 13 and a nut-like head 14 forming a shoulder 15 to engage the end edge of the barrel for locating the member in the bore. The body extends rearwardly in said bore to a suitable distance for spacing the inner end face 16 thereof from the end face of the filler block to provide an operating chamber 17 in which plunger-operating members work, and into which the heads of the plungers 12 extend as later described.

One or more transverse through channels 18 are formed in the member 13, preferably intersecting to comprise a grease receiving and containing chamber within the member, and an annular boss 19 formed on the body around the position of said channels has an annular inner recess 20 forming a trough-like chamber around the member 13 having free communication with the channels forming the internal chamber, and comprising a distributing header for delivering grease coincidently to the outer ends of said channels.

Preferably formed integrally with the cylinder 2 is a tank-supporting arm 21 having an axial channel 22 communicating with the distributing trough and a head 23 provided with an internally threaded ring 24 to receive the threaded end 25 of a grease tank 26 later described in detail for delivering grease to the internal chamber.

Intersecting the cylindrical body 13 are one or more bores 27 illustrated in the example as four in number arranged annularly around the axis of the body, having counter-bored inner ends forming enlarged chambers 28. The plungers 12 are slidably reciprocably supported in said bores longitudinally of the body, and have enlarged guide portions or sleeves 29 operating in the enlarged chambers and fixed to the outer ends of the plungers preferably by swaging portions of the plungers into conical sockets in the ends of the sleeves. The heads 30 of the plungers are rounded to receive the action of operating means presently described.

Springs 31 bearing oppositely against the bottoms of the enlarged chambers and the sleeves of the plungers tend to move the plungers into the working chamber 17. The chambers 28 thus form spring-containing recesses and also cooperate with the sleeve-like portions of the plungers to guide the plungers and retain the same in concentric relation with the bores.

Since the guide sleeves engage the walls of the chambers snugly they act as pistons, and in order to permit free movement of air to and from the spring-containing space for permitting free movement of the heads, small channels 32 are formed in the body 13 having ports in the peripheral face of the body and also communicating with an axial body recess 33 that communicates with the operating chamber 17.

Operating in the chamber 17 is a contrate cam member 34 having a cam face 35 inclined across the axis of the bore and a shank 36 rotatably mounted in the block 11 and slotted to form a clutch portion 37 engageable with lateral pins 38 adjacent the end of the motor shaft whereby the joint between the shaft and the contrate cam member is enclosed in the bore of the block.

A ball race 39 and balls 40 mounted in a recess in the end of the block form a bearing for the cam 34.

The cam when rotated will have a wobbling action with respect to the heads of the plungers and if engaged therewith would tend to effect successive reciprocation of the annularly arranged parallel plungers.

Preferably mounted in the operating chamber and engaging the heads of the plungers is a wobble disk 41, and the ball-supporting disk 39 is preferably interposed between the disk and the cam for reducing friction between the rotating cam and the oscillating plate, since it is not necessary to rotate the wobble plate and the same is preferably merely tilted back and forth to effect reciprocation of the plungers.

Referring again to the body 13, the nut-like portion 14 thereof is provided with a recess 43 having internal screwthreads to receive a bushing 44 threaded to receive a coupling or flexible tube 45 that may be connected to a suitable fitting or duct provided with a valve into which the grease is to be injected.

The outer end portions of the plunger bores communicating with the recess and nut 14 are preferably enlarged to form valve chambers 46, and springs 47 therein bear against ball valves 48 to hold the same against the seats at the inner ends of the chambers 46 for preventing backflow of grease from the outer recess 43.

Referring again to the grease tank and further describing the same, a piston 49 including cups 50 and disks 51 on opposite sides of the cup clamped thereto by a bolt 52 is normally urged toward the outlet of the tank by a spring 53 bearing against a cap 54 on the outer end of the tank.

The tank is supported by screwthreaded engagement of its outer end 25 in the head ring 24 and by removable engagement with a bracket-like arm 60 on the handle portion of the gun.

The tank is adapted to be removed from the head 23 for filling, and filling may be effected by means of a flexible member, preferably a chain 55 having one end link connected to an eye 56 in the bolt 52 and an opposite end link connected to a pin 57 provided with an operating button 58 whereby the user may grasp the button and pull the chain outwardly to retract the piston for drawing grease into the tank.

When the piston is fully retracted against the spring and the tank full, a link of the chain may be engaged with a pin 59 provided on the cap for that purpose to lock the chain against pressure of the spring and prevent the extrusion of grease.

When the tank is again mounted on the device, and the grease therein has opportunity to move through the channel toward the discharge portion of the gun, the chain may be released from the pin, and may further be moved inwardly of the tank through the opening in the cap. The pin may then be inserted in the opening of the cap whereby the means for operating the tank piston is safely isolated.

What I claim and desire to secure by Letters Patent is:

1. A grease gun including a plunger support having a plurality of grease compression chambers, means for supplying grease to said chambers, a grease delivery member communicating with said compression chambers, back pressure valves controlling communication between the compression chambers and the delivery member, plungers operable in said compression chambers, a rotatable shaft associated with the plunger support, a plunger actuating member on the shaft and adapted for rotation therewith, a floating wabble plate in disconnected relation with and positioned between said plungers and the actuating member to effect reciprocation of the plungers upon rotation of the actuating member, and means for holding the plungers and actuating member in operative engagement with said plate.

2. A grease gun including a plunger support having a plurality of grease compression chambers, means for supplying grease to said chambers, a grease delivery member communicating with said compression chambers, back pressure valves controlling communication between the compression chambers and the delivery member, plungers operable in the compression chambers, a rotatable shaft associated with the plunger support, a plunger actuating member on the shaft and adapted for rotation therewith, a floating wabble plate in disconnected relation with and positioned between said plungers and the actuating member to effect reciprocation of the plungers upon rotation of the actuating member, an anti-friction bearing member between the wabble plate and the actuating member, and means for holding the plungers and bearing member in contacting engagement with opposite sides of said plate.

3. A grease gun including a plunger support having a plurality of grease compression chambers, means for supplying grease to said chambers, a grease delivery member communicating with said compression chambers, back pressure valves controlling communication between the compression chambers and the delivery member, plungers operable in the grease compression chambers, a relatively non-rotatable member operably engaging all of the plungers, a rotatable member in substantial axial alignment with the non-rotatable member having rotative movement with relation to the non-rotatable member to effect oscillation of the non-rotatable member to effect reciprocatory movement of the plungers.

4. A grease gun including a plunger support having a plurality of grease compression chambers, means for supplying grease to said chambers, a grease delivery member communicating with said compression chambers, back pressure valves controlling communication between the compression chambers and the delivery member, plungers operable in the grease compression chambers, a relatively non-rotatable member operably engaging all of the plungers, a rotatable member in substantial axial alignment with the non-rotatable member for effecting oscillation of the non-rotatable member for moving the plungers in one direction, and springs on the plungers for moving the plungers in the opposite direction.

5. In a grease gun including a plunger support having a circular series of grease compression chambers, means for supplying grease to said compression chambers, a grease delivery member communicating with said compression chambers, back pressure valves controlling communication between the compression chambers and the delivery member, plungers operable in said chambers, a floating wabble plate engaging the plungers, a rotatable shaft mounted in axial alignment with the plungers, a contrate cam member on the shaft in abutting relation with the wabble plate for actuating the wabble plate to effect reciprocation of the plungers, and means for rotating the shaft.

6. In a grease gun including a plunger support having a plurality of grease compression chambers, means for supplying grease to said compression chambers, a grease delivery member communicating with said compression chambers, back pressure valves controlling communication between the compression chambers and the delivery member, plungers operable in the compression chambers, a rotatable shaft mounted in axial alignment with the plungers, a contrate cam member on the shaft for actuating the plungers, yielding means for urging the plungers toward said cam member and means for rotating the shaft.

7. A grease gun including a motor having a driving shaft, a barrel member supported by the motor in axial alignment with the motor, a plunger-supporting member carried by the barrel member having a plurality of plunger chambers, means for delivering grease to the plunger chambers, a delivery member in communication with the chambers, plungers operable in the chambers, valves controlling communication between the delivery member and the plunger chambers, a wabble plate engaging the ends of the plungers, rotary means for actuating the wabble plate to effect movement of the plungers, and springs associated with the plungers for retaining the plungers in engagement with the wabble plate.

8. In a grease gun including a barrel member having a bore, a plunger unit receivable in the bore comprising a plunger-supporting member, and having a grease inlet and a plurality of compression chambers communicating with the inlet, plungers operable in the compression chambers, heads on the plungers, springs sleeved on the plungers and engaging the heads, a floating wabble plate engaging the heads of the plungers to actuate the plungers in progressive succession, and means in disconnected relation with the wabble plate for actuating the wabble plate to effect actuation of the plungers.

9. In a grease gun, a plunger-supporting member having a circular series of plunger-receiving bores and having common discharge and supply chambers communicating with said bores, valves controlling communication between the bores and the discharge chamber, plungers operable in the bores, rounded heads on the plungers guided in said supporting member, springs sleeved on the plungers and engaging the said heads to normally retain the plungers in retracted position, and rotatable means having a plane face engaging said heads to operate the plungers in progressive relation.

10. In a grease gun including a plunger support having a plurality of grease compression chambers, means for supplying grease to said compression chambers, a common grease delivering member communicating with said compression chambers, back pressure valves controlling communication between the compression chambers and the delivery member, plungers operable in said chambers, and a contrate cam member for operating said plungers so that the effective stroke of one plunger overlaps the effective stroke of the succeeding plunger to provide continuous flow of grease into the delivery member.

11. A grease gun including a plunger support having a grease compression chamber, means for supplying grease to said chamber, a grease delivery member communicating with said compression chamber, a back pressure valve controlling communication between the compression chamber and the delivery member, a plunger operable in said compression chamber, a rotatable shaft associated with the plunger support, a plunger actuating member on the shaft in end abutting relation with the plunger and adapted for rotation with the shaft, and a floating wabble plate positioned between said plunger and the actuating member to effect reciprocation of the plunger upon rotation of the actuating member.

12. In a grease gun including a plunger support having a grease compression chamber, means for supplying grease to said compression chamber, a grease delivery member communicating with said compression chamber, a back pressure valve controlling communication between the compression chamber and the delivery member, a plunger operable in said chamber, a rotatable shaft, a contrate cam member connected with the shaft having a plane bearing face, a floating disc having opposite plane faces mounted between said cam member and the plunger, and means for rotating the shaft.

In testimony whereof I affix my signature.

PHILIP E. KOPP.